United States Patent
Lu et al.

(10) Patent No.: US 8,244,514 B2
(45) Date of Patent: Aug. 14, 2012

(54) CORRELATING OUT INTERACTIONS AND PROFILING THE SAME

(75) Inventors: Sheng Lu, Beijing (CN); Qingbo Wang, Beijing (CN); Meng Ye, Beijing (CN); Long Cheng, Beijing (CN); Dong Jun Lan, Beijing (CN); Xing Fang, Beijing (CN); Gang Crl Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1132 days.

(21) Appl. No.: 12/110,578

(22) Filed: Apr. 28, 2008

(65) Prior Publication Data
US 2008/0270102 A1  Oct. 30, 2008

(30) Foreign Application Priority Data
Apr. 28, 2007  (CN) .......................... 2007 1 0107717

(51) Int. Cl.
G06G 7/62  (2006.01)
(52) U.S. Cl. ....................................... 703/17
(58) Field of Classification Search ....................... 703/17
See application file for complete search history.

(56) References Cited

U.S. PATENT DOCUMENTS

| | | | |
|---|---|---|---|
| 6,108,700 A | 8/2000 | Maccabee et al. | |
| 6,381,628 B1 | 4/2002 | Hunt | |
| 6,792,460 B2 | 9/2004 | Oulu et al. | |
| 6,983,463 B1 | 1/2006 | Hunt | |
| 2003/0009507 A1 | 1/2003 | Shum | |
| 2003/0229695 A1 | 12/2003 | Mc Bride | |
| 2006/0235664 A1 | 10/2006 | Vinberg et al. | |
| 2007/0011330 A1* | 1/2007 | Dinker et al. | 709/226 |

FOREIGN PATENT DOCUMENTS

| | | |
|---|---|---|
| EP | 1 229 685 A2 | 8/2002 |
| WO | WO/01 10082 A2 | 2/2001 |

OTHER PUBLICATIONS

Load Testing Monitors, http://www.mercury.com/us/products/performance-center/loadrunner/monitors/COM.html, 2006, pp. 1-4, Mercury Interactive Corporation.

Margulies, D., Reeling in the tiers, http://www.infoworld.com/articles/fe/xml/02/05/20/020520webapptci.html, May 16, 2002, pp. 1-4.

* cited by examiner

*Primary Examiner* — Hugh Jones
(74) *Attorney, Agent, or Firm* — Jon A. Gibbons; Fleit Gibbons Gutman Bongini & Bianco PL

(57) ABSTRACT

A method and system for correlating out interactions, which occur due to one or a set of specific events, of an application, which is deployed in multiple adjacent tiers in an actual environment is described. First, a simulation environment corresponding to the actual environment is created. Then, specific events are led to the actual environment and the simulation environment. A pattern(s) of interactions, which are related with the specific events, between adjacent tiers in the simulation environment and a large number of interactions between adjacent tiers in the actual environment are obtained. Afterwards, interactions, which are related with the specific events, between adjacent tiers among the obtained interactions between adjacent tiers in the actual environment are correlated using a template of the obtained pattern(s) of interactions, which are related with the specific events, between adjacent tiers in the simulation environment as a template.

15 Claims, 3 Drawing Sheets

CORRELATING OUT INTERACTIONS AND PROFILING THE SAME

CROSS-REFERENCE TO RELATED APPLICATIONS

This application is based upon and claims priority from prior Chinese Patent Application No. 200710107717.6, filed on Apr. 28, 2007 the entire disclosure of which is herein incorporated by reference in its entirety.

FIELD OF THE INVENTION

The present invention relates to the field of information technology, and more particularly, to a method and system for correlating out interactions, which occur due to one or a set of specific events, of an application, which is deployed in multiple tiers, between respective adjacent tiers in an actual (production) environment and for profiling the same.

BACKGROUND OF THE INVENTION

Today, complex e-business applications (for example, the e-banking applications) are manytimes deployed in multiple tiers (including web server, application server, and database server for example). End-users' experience long response delay to get from an e-business application the response to their request. And both end-users and the owner of the e-business application do not know the source of this delay. In fact, the there are often many potential sources of this delay, such as the network latency or other network problems, the web server latency or other server problems, the application server latency, and/or the database server latency.

Some e-business applications are quite important for end-users and application owners. To these e-business applications, therefore, all problems must be identified, located and fixed before things get worse.

To application owners, application profiling is a good way to find and fix all problems before things get worse.

As is well known to those skilled in the art, there are two different types of application profiling solutions: one is log based, the other is network based.

Each of them has their own pros and cons.

As those skilled in the art know, a major problem in network-based multi-tier application profiling is there is no way to correlate interactions, which occur due to one or a set of specific events, between adjacent tiers in an actual environment, so that only statistics-based end-to-end analysis (which cannot reflect said specific events) other than more precise non-statistical end-to-end analysis can be provided for said specific events.

Considering an exemplary actual environment as shown in FIG. 1, in this figure, an e-business application is deployed in multiple tiers including a load balancer 110, a web server 120, an application server 130, and a database server 140.

Clients 160-1, 160-2, ..., 160-N send various requests to load balancer 110 and receive responses of corresponding requests therefrom.

It should be understood that a network, which might be a local area network, a metropolitan area network, a wide area network, or a combination thereof, may be included between clients 160-1, 160-2, ..., 160-N and load balancer 110, between load balancer 110 and web server 120, between web server 120 and application server 130, as well as between application server 130 and database server 140. For example, the network may be an 802.x-based local area network.

To correlate interactions, which occur due to one or a set of specific events, between adjacent tiers, a straightforward and simple way is to know the characteristic of each interaction. For example, each interaction is about the user "user 1." But in a multi-tier environment, the characteristic would be lost during the processing procedure. For example, between application server 130 and database server 140, the interaction might be the database request structured query language (SQL) statement "select * from accountDB where carID=80020005123456789" where there is no "user 1" in the interaction.

Therefore, though in network-based multi-tier application profiling, all interactions between adjacent tiers can be obtained by interaction obtaining means that includes, for example, switch, router and other device, interaction obtaining means can easily obtain interactions between web server 120 and application 130 and interactions between application server 130 and database server 140 by leveraging some existing technologies, such as switch port mirroring, fiber splitter, cable tap, etc, however, in multi-tier case, characteristic of interactions would be lost during the processing procedure, and in the actual environment, the number of interactions between tiers is huge, therefore, it is difficult to correlate interactions, which occur due to one or a set of specific events, between adjacent tiers, and more precise non-statistical end-to-end analysis cannot be provided for the specific events.

SUMMARY OF THE INVENTION

The present invention correlates interactions, which occur due to one or a set of specific events, of an application, which is deployed in multiple tiers, between respective adjacent tiers in an actual environment. The specific events may be, but are not limited to, a request of a user, a complete service processing, an information update, etc.

The present invention profiles interactions, which occur due to one or a set of specific events, of an application, which is deployed in multiple tiers, between respective adjacent tiers in an actual environment. The specific events may be, but are not limited to, a request of a user, a complete service processing, an information update, etc.

According to a first aspect of the present invention, proposed is a method for correlating out interactions, which occur due to one or a set of specific events, of an application, which is deployed in multiple tiers, between respective adjacent tiers in an actual environment. The method comprises the steps of: creating a simulation environment corresponding to the actual environment; leading the specific events to the actual environment and the simulation environment; obtaining a set of patterns of interactions, which are related with the specific events, between adjacent tiers in the simulation environment and obtaining interactions between adjacent tiers in the actual environment; correlating out interactions, which are related with the specific events, between adjacent tiers among the obtained interactions between adjacent tiers in the actual environment by using the obtained pattern(s) of interactions, which are related with the specific events, between adjacent tiers in the simulation environment as a template.

According to a second embodiment of the present invention, proposed is a system for correlating out interactions, which occur due to one or a set of specific events, of an application, which is deployed in multiple tiers, between respective adjacent tiers in an actual environment. The system comprises: leading means for leading the specific events to the actual environment and a simulation environment corresponding to the actual environment; pattern obtaining means for obtaining a pattern(s) of interactions, which are related with the specific events, between adjacent tiers in the simulation environment; interaction obtaining means for obtaining interactions between adjacent tiers in the actual environment; and correlating means for correlating out interactions, which are related with the specific events, between adjacent tiers among the interactions between adjacent tiers in the actual environment, which are obtained by the interaction obtaining means, by using the pattern(s) of interactions, which are related with the specific events, between adjacent tiers in the simulation environment, which is obtained by the pattern obtaining means as a template.

According to a third embodiment of the present invention, proposed is a network-based application profiling method for profiling interactions, which occur due to one or a set of specific events, of an application, which is deployed in multiple tiers, between respective adjacent tiers in an actual environment. The method comprises the steps of: creating a simulation environment corresponding to the actual environment; leading the specific events to the actual environment and the simulation environment; obtaining a pattern(s) of interactions, which are related with the specific events, between adjacent tiers in the simulation environment and obtaining interactions between adjacent tiers in the actual environment; correlating out interactions, which are related with the specific events, between adjacent tiers among the obtained interactions between adjacent tiers in the actual environment by using the obtained pattern(s) of interactions, which are related with the specific events, between adjacent tiers in the simulation environment as a template; and profiling the correlated out interactions, which are related with the specific events, between adjacent tiers.

According to a fourth embodiment of the present invention, proposed is a network-based application profiling system for profiling interactions, which occur due to one or a set of specific events, of an application, which is deployed in multiple tiers, between respective adjacent tiers in an actual environment. The system comprises: leading means for leading or routing the specific events to the actual environment and a simulation environment corresponding to the actual environment; pattern obtaining means for obtaining a pattern(s) of interactions, which are related with the specific events, between adjacent tiers in the simulation environment; interaction obtaining means for obtaining interactions between adjacent tiers in the actual environment; correlating means for correlating out interactions, which are related with the specific events, between adjacent tiers among the interactions between adjacent tiers in the actual environment, which are obtained by the interaction obtaining means, by using the pattern(s) of interactions, which are related with the specific events, between adjacent tiers in the simulation environment, which are obtained by the pattern obtaining means as a template; and profiling means for profiling the interactions, which are related with the specific events, between adjacent tiers, which are correlate by the correlating means.

According to the present invention, interactions, which occur due to one or a set of specific events, between respective adjacent tiers in an actual environment can be correlate, so that more precise non-statistical end-to-end analysis can be provided for the specific events for network-based multi-tier application profiling.

BRIEF DESCRIPTION ON THE DRAWINGS

Other objects and effects of the present invention will become more apparent and easy to understand from the following description, taken in conjunction with the accompanying drawings wherein.

Like reference numerals designate the same, similar, or corresponding features or functions throughout the drawings.

DESCRIPTION OF THE PREFERRED EMBODIMENTS

The present invention is based on the following fact: unlike that there are an enormous number of interactions about many events in an actual environment, in a clear simulation environment, there are interactions only about one or a few events between adjacent tiers, so that a pattern(s) of interactions related with a specific event can be obtained quite easily.

Therefore, the basic idea of the present invention is to first create a simulation environment corresponding to the actual environment, then lead one or a set of specific events to the actual environment and the simulation environment, obtain a pattern(s) of interactions, which are related with the specific events, between adjacent tiers in the simulation environment and obtain a large number of interactions between adjacent tiers in the actual environment, correlate interactions, which are related with the specific events, between adjacent tiers among the obtained large number of interactions between adjacent tiers in the actual environment by using the obtained pattern(s) of interactions, which are related with the specific events, between adjacent tiers in the simulation environment as a template, and finally profile the correlate interactions, which are related with the specific events, between adjacent tiers. In this manner, more precise non-statistical end-to-end analysis can be provided for the specific events.

Hereinafter, the embodiments of the present invention will be described in conjunction with the accompanying drawings.

Figure 2:
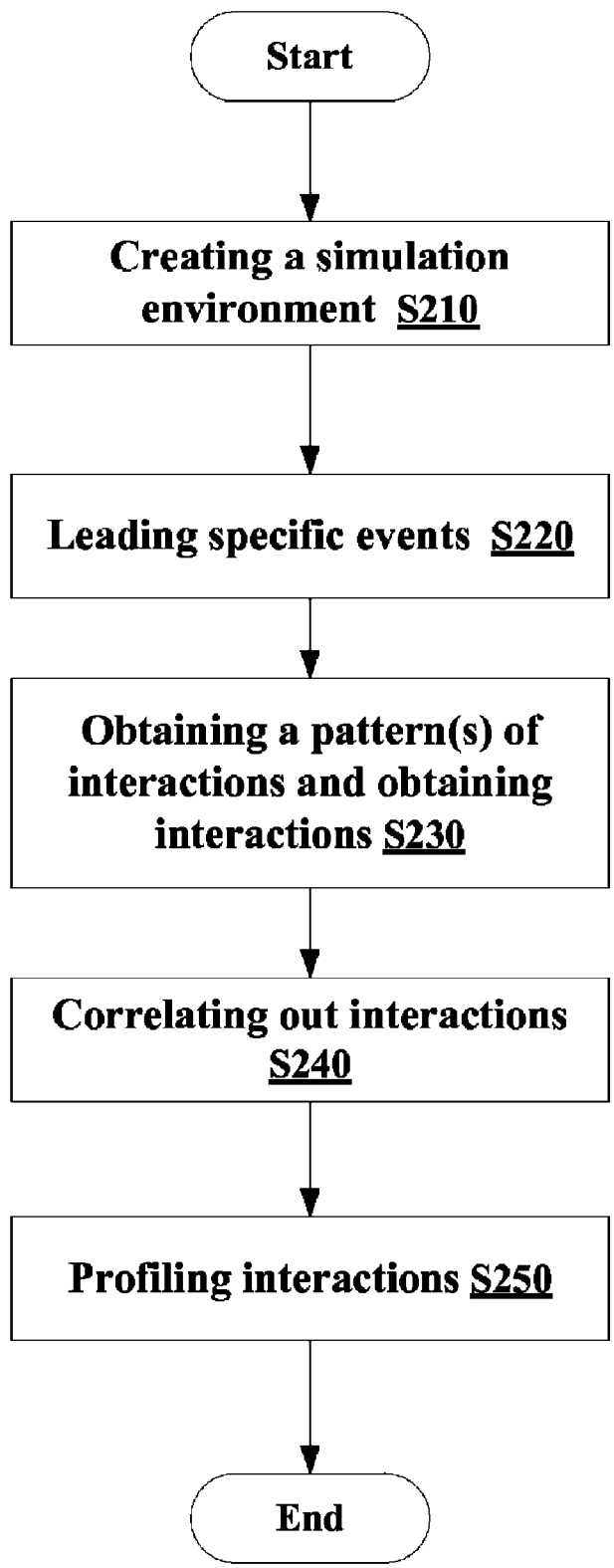
FIG. 2 shows a flowchart of a method for correlating out interactions, which occur due to one or a set of specific events, of an application, which is deployed in multiple tiers, between respective adjacent tiers in an actual environment and for profiling the same according to an embodiment of the present invention.

FIG. 2 shows a flowchart of a method for correlating out interactions, which occur due to one or a set of specific events, of an application, which is deployed in multiple tiers, between respective adjacent tiers in an actual environment and for profiling the same according to an embodiment of the present invention.

First, a simulation environment corresponding to the actual environment is created (step S210).

Figure 1:
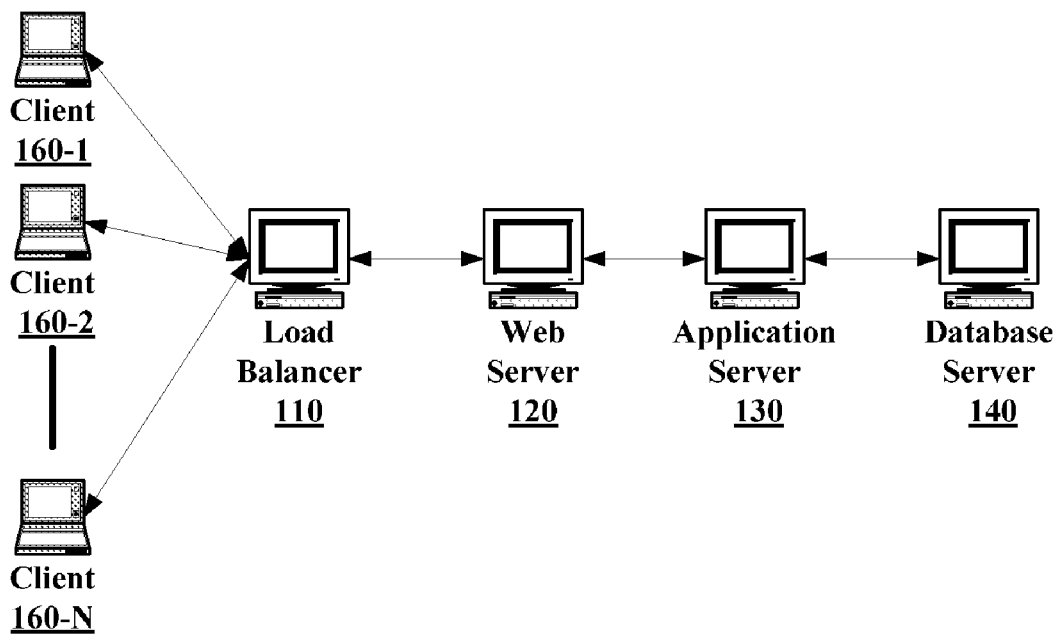
FIG. 1 shows an exemplary actual environment.

Here, suppose the actual environment is an environment as shown in FIG. 1. That is to say, an application is deployed in multiple tiers including a load balancer 110, a web server 120, an application server 130, and a database server 140.

Clients 160-1, 160-2, . . . , 160-N send various requests to load balancer 110 and receive responses of corresponding requests therefrom.

It should be understood that a network, which might be a local area network, a metropolitan area network, a wide area network, or a combination thereof, may be included between clients 160-1, 160-2, . . . , 160-N and load balancer 110, between load balancer 110 and web server 120, between web server 120 and application server 130, as well as between application server 130 and database server 140. For example, the network may be an 802.x-based local area network.

Of course, those skilled in the art should appreciate that the actual environment is merely exemplary. In other embodiments, there may be no load balancer 110, or web server 120 and application server 130 may be deployed in the same server.

The created simulation environment must correspond to the actual environment. For example, if there is no load balancer in the actual environment, then there is also no load balancer in the simulation environment; or if the web server and the application server are deployed in one server in the actual environment, then the web server and the application server also must be deployed in one server in the simulation environment.

Therefore, the simulation environment corresponding to the actual environment shown in FIG. 1 also comprises: a load balancer, a web server, an application server, and a database server.

To save costs or utilize existing resources, hardware in the simulation environment may be different from hardware in the actual environment. For example, the application server in the actual environment is a mainframe, whereas in the simulation environment, the application server may be a minicomputer or even a personal computer. However, software on the hardware in the simulation environment should be identical to software on the hardware in the actual environment.

Additionally, for example, in case that there is a huge amount of data in the database in the actual environment, it might be rather impractical to replicate all data in the database in the actual environment to the database in the simulation environment. In this case, it can be such that only desired data (for example, data needed to perform a specific "search" operation (the specified user is "user 1" for example)) are replicated to the database in the simulation environment.

Figure 3:
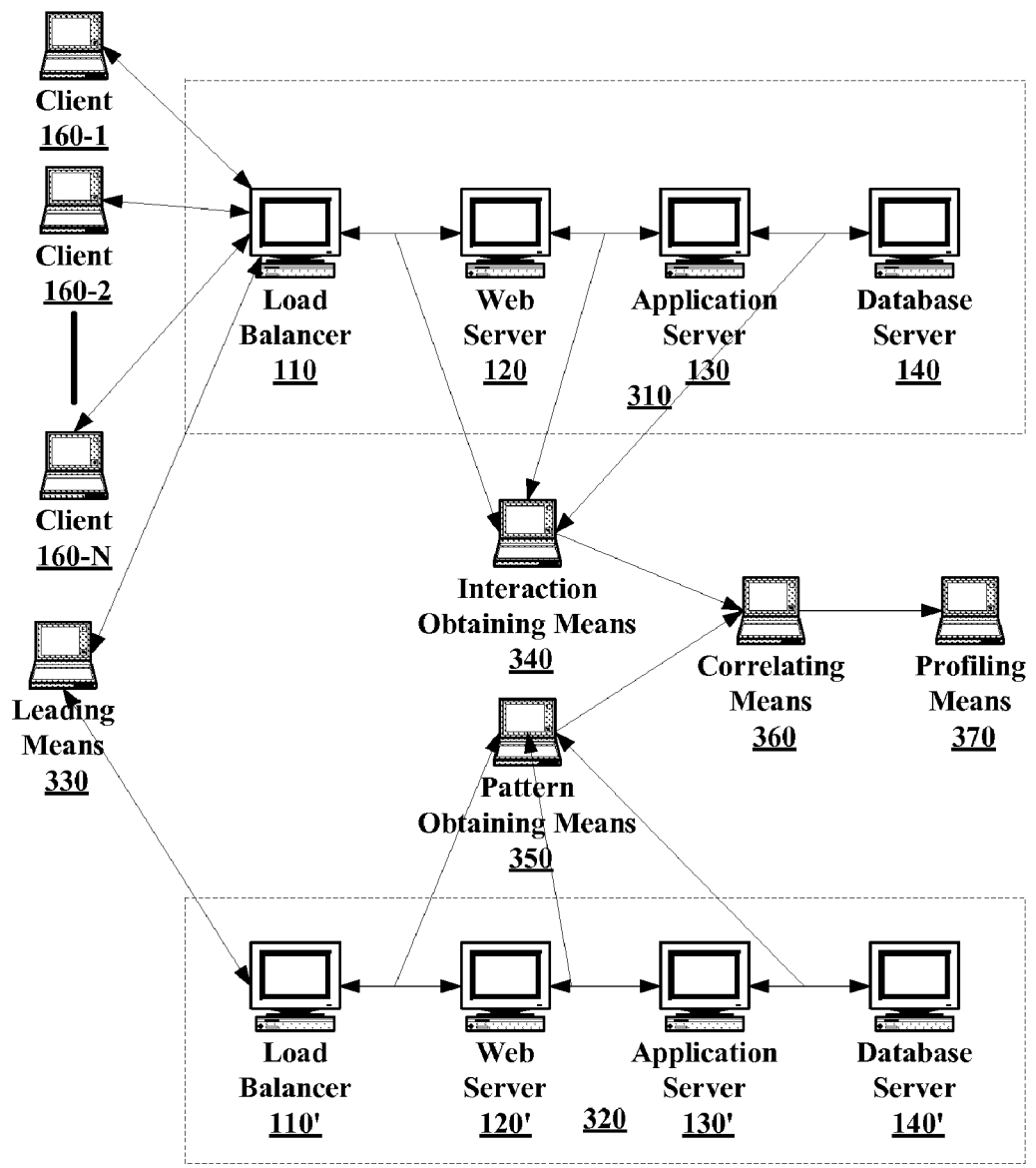
FIG. 3 shows a block diagram of a system for correlating out interactions, which occur due to one or a set of specific events, of an application, which is deployed in multiple tiers, between respective adjacent tiers in an actual environment and for profiling the same according to an embodiment of the present invention.

FIG. 3 shows a block diagram of a system for correlating out interactions, which occur due to one or a set of specific events, of an application, which is deployed in multiple tiers, between respective adjacent tiers in an actual environment and for profiling the same according to an embodiment of the present invention.

To facilitate illustration and understanding, the actual environment and the simulation environment are both included in FIG. 3. The actual environment is denoted by numeral 310, and the simulation environment is denoted by numeral 320. Additionally, the load balancer, the web server, the application server, and the database server in simulation environment 320 are denoted by 110', 120', 130', and 140' respectively.

Then, one or a set of specific events are led to the actual environment and the simulation environment (step S220).

As shown in FIG. 3, leading means (for example, a computer) 330 leads a specific event to actual environment 310 and simulation environment 320. For example, leading means 330 may lead a specific event to actual environment 310 and simulation environment 320 by sending to them a "search" request.

By the way, corresponding to the circumstance described above, a network, which might be a local area network, a metropolitan area network, a wide area network, or a combination thereof, may be included between leading means 330 and load balancer 110', between load balancer 110' and web server 120', between web server 120' and application server 130', and between application server 130' and database server 140'. For example, the network may be an 802.x-based local area network.

Due to the specific event, interactions related with the specific event occur between load balancer 110 and web server 120, between web server 120 and application server 130, and between application server 130 and database server 140 in actual environment 310.

Likewise, due to the specific event, interactions related with the specific event occur between load balancer 110' and web server 120', between web server 120' and application server 130', and between application server 130' and database server 140' in simulation environment 320.

While leading means 330 leads the specific event to actual environment 310, clients 160-1, 160-2, . . . , 160-N lead other events, for example various requests, to actual environment 310. Therefore, in addition to interactions related with the specific event, an enormous number of interactions related with other events occur between load balancer 110 and web server 120, between web server 120 and application server 130, and between application server 130 and database server 140 in actual environment 310.

Comparatively, except that leading means 330 leads the specific event to simulation environment 320, there are no other devices leading other events to simulation environment 320. Therefore, only interactions related with the specific event occur between load balancer 110' and web server 120', between web server 120' and application server 130', and between application server 130' and database server 140' in simulation environment 320.

Next, a pattern(s) of interactions, which are related with the specific event, between adjacent tiers in simulation environment 320 and a large number of interactions between adjacent tiers in actual environment 310 are obtained (step S230).

As shown in FIG. 3, interaction obtaining means 340 obtains the large number of interactions between adjacent tiers in actual environment 310. Interaction obtaining means 340 may leverage some existing technologies, such as switch port mirroring, fiber splitter, cable tap, etc. to obtain the large number of interactions between adjacent tiers in actual environment 310. For example, interaction obtaining means 340 may include switch, router, or other device. Moreover, interaction obtaining means 340 may process the obtained interactions, e.g. rank them in accordance with their arrival times.

Furthermore, pattern obtaining means 350 obtains a pattern(s) of interactions, which are related with the specific event, between adjacent tiers in simulation environment 320. Pattern obtaining means 350 may leverage some existing technologies, such as switch port mirroring, fiber splitter, cable tap, etc. to obtain interactions, which are related with the specific event, between adjacent tiers in simulation environment 320 and generate pattern(s) of these interactions. For example, pattern obtaining means 350 may include switch, router, or other device.

The pattern represents characteristic of interactions between adjacent tiers. Additionally, pattern obtaining means 350 may generate one or more patterns.

Patterns of interactions include, but are not limited to, the interaction times between two tiers, the HTTP (hypertext transfer protocol) request lines, the SOAP (simple object access protocol) request URLs (uniform resource locator), the database request SQL statements, and/or the request sequences.

It should be understood that for the specific event, the number of interaction between two adjacent tiers may be one or more.

For example, for a specific event, interactions between two adjacent tiers (e.g. between the application server and the database server) are SQL statements "select * from accountDB where cardID=80020005123456789" and "update accountInfo set balance=5025.00 where cardID=80020005123456789".

Afterwards, interactions, which are related with the specific event, between adjacent tiers are correlate among the obtained large number of interactions between adjacent tiers in actual environment 310 by using the obtained pattern(s) of interactions, which are related with the specific event, between adjacent tiers in simulation environment 320 as a template.

As shown in FIG. 3, interaction obtaining means 340 provides to correlating means 360 the obtained large number of interactions between adjacent tiers in actual environment 310, and pattern obtaining means 350 provides to correlating means 360 the obtained pattern(s) of interactions, which are related with the specific event, between adjacent tiers in simulation environment 320. Then, correlating means 360 correlates out interactions, which are related with the specific event, between adjacent tiers among the obtained large number of interactions between adjacent tiers in actual environment 310 by using the obtained pattern(s) of interactions, which are related with the specific event, between adjacent tiers in simulation environment 320 as a template.

When correlating out interactions, which are related with the specific event, between adjacent tiers among the obtained large number of interactions between adjacent tiers in actual environment 310 by using the obtained pattern(s) of interactions, which are related with the specific event, between adjacent tiers in simulation environment 320 as a template, correlating means 360 may use a variety of algorithms.

Not all patterns are of identical importance. For example, some patterns have less accuracy but could save time (these patterns are called rough patterns) when used as a template for correlating out interactions, which are related with the specific event, between adjacent tiers among the obtained large number of interactions between adjacent tiers in actual environment 310; while some patterns have more accuracy but may need more time (these patterns are called precise patterns) when used as a template for correlating out interactions, which are related with the specific event, between adjacent tiers among the obtained large number of interactions between adjacent tiers in actual environment 310.

Therefore, either a rough pattern or a precise pattern can be selected as a template in accordance with needs. Moreover, it can be such that a rough pattern can be applied as a template to correlate interactions, and then a precise pattern can be applied as a template to re-correlate the correlate interactions.

In this manner, a variety of operations can be performed on the correlate interactions, which are related with the specific event, between adjacent tiers.

For example, interactions, which are related with the specific event, between adjacent tiers are profiled in step S250, so as to provide more precise non-statistical end-to-end analysis for the specific event. That is, as shown in FIG. 3, profiling means 370 profiles interactions, which are related with the specific event, between adjacent tiers, which are correlate by correlating means 360.

For example, through the profiling, it is able to known how much time has been spent on a specific tier for the "search" specific event. As a result, if a too long time is spent on a certain tier, then the application can be improved for this tier.

It should be noted that in order to facilitate easier understanding of the present invention, the foregoing description omits more detailed technical details that are well known to those skilled in the art and might be indispensable to the implementation of the present invention.

The specification of the present invention has been presented for purposes of illustration and description, and is not intended to be exhaustive or limited to the invention in the form disclosed. Many modifications and variations will be apparent to those of ordinary skill in the art.

Therefore, the embodiments were chosen and described in order to best explain the principles of the invention, the practical application thereof, and to enable others of ordinary skill in the art to understand that all modifications and alterations made without departing from the spirit of the present invention fall into the protection scope of the present invention as defined in the appended claims.

What is claimed is:

1. A method for correlating out interactions, the method comprising:
    receiving a set of specific events from an application, wherein the application is deployed across a plurality of adjacent tiers in an actual environment;
    creating a simulation environment corresponding to the actual environment including a plurality of adjacent tiers corresponding to the plurality adjacent tiers of the actual environment;
    routing the set of specific events to the actual environment and the simulation environment;
    obtaining a set of patterns associated with a plurality of interactions between adjacent tiers in the plurality of adjacent tiers of the simulation environment, wherein the plurality of interactions are related to the set of specific events;
    obtaining a plurality of interactions between at least two adjacent tiers in the plurality of adjacent tiers of the actual environment; and
    applying the set of patterns as a template to the plurality of interactions obtained for the at least two adjacent tiers of the actual environment; and
    correlating out, with a processor, for the set of specific events and based on applying the set of patterns as a template, interactions between the plurality of interactions which have been obtained for the actual environment and the plurality of interactions of the simulation environment.

2. The method according to claim 1, wherein the set of patterns associated with the plurality of interactions is based on interaction times between two tiers of the plurality of adjacent tiers.

3. The method according to claim 1, wherein the set of patterns associated with the plurality of interactions is based on HTTP request lines.

4. The method according to claim 1, wherein the set of patterns associated with the plurality of interactions is based on SOAP request URLs.

5. The method according to claim 1, wherein the set of patterns associated with the plurality of interactions is based on database request SQL statements and/or sequences which have been requested.

6. The method according to claim 1, wherein the set of patterns associated with the plurality of interactions is based on request sequences.

7. The method according to claim 1, wherein the set of patterns is at least one of a rough pattern and a precise pattern.

8. The method according to claim 7, wherein the rough pattern is applied as the template first for correlating out interactions, and then the precise pattern is applied as an additional template for re-correlating the interactions which have been previously correlated.

9. A system for correlating out interactions, the system comprising:
    an actual environment comprising a plurality of adjacent tiers;

a set of specific events from an application, wherein the application is deployed across the plurality of adjacent tiers in the actual environment;

a simulation environment corresponding to the actual environment including a plurality of adjacent tiers corresponding to the plurality adjacent tiers of the actual environment;

a first information processing system comprising a memory and a processor, wherein the processor configured to route the set of specific events to the actual environment and the simulation environment;

a second information processing system comprising a memory and a processor, wherein the processor configured to obtain a set of patterns associated with a plurality of interactions between adjacent tiers in the plurality of adjacent tiers of the simulation environment, and obtain a plurality of interactions between at least two adjacent tiers in the plurality of adjacent tiers of the actual environment; and a third information processing system comprising a memory and a processor, wherein the processor configured to apply the set of patterns as a template to the plurality of interactions obtained for the at least two adjacent tiers of the actual environment, and correlate out, for the set of specific events and based on applying the set of patterns as a template, interactions between the plurality of interactions which have been obtained for the actual environment and the plurality of interactions of the simulation environment.

10. The system according to claim 9, wherein the set of patterns associated with the plurality of interactions is based on interaction times between two tiers of the plurality of adjacent tiers.

11. The system according to claim 9, wherein the set of patterns associated with the plurality of interactions is based on HTTP request lines.

12. The system according to claim 9, wherein the set of patterns associated with the plurality of interactions is based on SOAP request URLs.

13. The system according to claim 9, wherein the set of patterns associated with the plurality of interactions is based on database request SQL statements, and/or sequences which have been requested.

14. The system according to claim 9, wherein the set of patterns is at least one of a rough pattern and a precise pattern.

15. The system according to claim 14, wherein the rough pattern is applied as the template first for correlating out interactions and then the precise pattern is used as a second template for re-correlating the interactions which have been previously correlated.

* * * * *